(12) United States Patent
Shipley et al.

(10) Patent No.: US 8,472,952 B1
(45) Date of Patent: Jun. 25, 2013

(54) DISCOVERING A FREQUENCY OF A WIRELESS ACCESS POINT

(75) Inventors: Trevor D. Shipley, Olathe, KS (US); Cesar Perez, Olathe, KS (US); John D. Sumler, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 182 days.

(21) Appl. No.: 12/956,178

(22) Filed: Nov. 30, 2010

(51) Int. Cl.
*H04W 4/00* (2009.01)

(52) U.S. Cl.
USPC ............... 455/435.1; 455/450; 455/452.1

(58) Field of Classification Search
USPC .................. 455/435.1, 450, 452.1
See application file for complete search history.

(56) References Cited

U.S. PATENT DOCUMENTS

| | | | |
|---|---|---|---|
| 6,021,328 | A | 2/2000 | Curtis et al. |
| 6,480,541 | B1 | 11/2002 | Girod et al. |
| 6,591,110 | B1 | 7/2003 | Kim et al. |
| 6,606,496 | B1 | 8/2003 | Salvarani et al. |
| 6,625,119 | B1 | 9/2003 | Schuster et al. |
| 6,839,356 | B2 | 1/2005 | Barany et al. |
| 6,980,523 | B1 | 12/2005 | Lipford et al. |
| 7,058,124 | B2 | 6/2006 | Koo |
| 7,099,283 | B2 | 8/2006 | Matta et al. |
| 7,130,311 | B2 | 10/2006 | Yavuz et al. |
| 7,142,562 | B2 | 11/2006 | Yavuz et al. |
| 7,245,915 | B2 | 7/2007 | Matta et al. |
| 7,328,027 | B1 | 2/2008 | Mangal |
| 7,411,923 | B2 | 8/2008 | Attar et al. |
| 7,411,974 | B2 | 8/2008 | Attar et al. |
| 7,426,395 | B2 | 9/2008 | Stephens |
| 7,440,431 | B2 | 10/2008 | Sindhushayana et al. |
| 7,486,645 | B2 | 2/2009 | Li et al. |
| 2003/0064741 | A1 | 4/2003 | Silva et al. |
| 2003/0117956 | A1 | 6/2003 | Lee |
| 2004/0017860 | A1 | 1/2004 | Liu |
| 2004/0057420 | A1 | 3/2004 | Curcio et al. |
| 2004/0141499 | A1* | 7/2004 | Kashima et al. ............. 370/380 |
| 2004/0196852 | A1 | 10/2004 | Aksu et al. |
| 2005/0032522 | A1 | 2/2005 | Soong et al. |
| 2005/0059396 | A1* | 3/2005 | Chuah et al. ............. 455/435.1 |
| 2005/0197118 | A1* | 9/2005 | Mitchell ...................... 455/434 |
| 2005/0286440 | A1 | 12/2005 | Strutt et al. |
| 2006/0077994 | A1 | 4/2006 | Spindola et al. |
| 2006/0133332 | A1* | 6/2006 | Achanta ....................... 370/338 |
| 2006/0252429 | A1 | 11/2006 | Chen et al. |

(Continued)

FOREIGN PATENT DOCUMENTS

| WO | WO 2004004249 | 1/2004 |
|---|---|---|
| WO | WO 2004028095 | 4/2004 |

OTHER PUBLICATIONS

R. Droms, "Dynamic Host Configuration Protocol," Network Working Group, Request for Comments: 2131, Mar. 1997.

(Continued)

*Primary Examiner* — Barry Taylor (57) ABSTRACT

A dual-mode wireless communication device (WCD), capable of communicating via both Wifi and cellular technologies, registers with a Wifi access point. As part of the registration process, or at some point thereafter, the Wifi access point transmits a frequency at which a femtocell access point operates. Upon receiving this frequency, the WCD registers for cellular service with the femtocell access point. As a result, the WCD may be able to communicate simultaneously via both the Wifi access point and the femtocell access point.

9 Claims, 8 Drawing Sheets

U.S. PATENT DOCUMENTS

| | | | |
|---|---|---|---|
| 2007/0060165 A1 | 3/2007 | Black et al. | |
| 2007/0109967 A1 | 5/2007 | Ha | |
| 2007/0117580 A1 | 5/2007 | Fehr | |
| 2008/0049706 A1 | 2/2008 | Khandekar et al. | |
| 2009/0135758 A1 | 5/2009 | Alper et al. | |
| 2009/0288139 A1 | 11/2009 | Huber et al. | |
| 2009/0316604 A1 | 12/2009 | Singh et al. | |
| 2010/0027469 A1 | 2/2010 | Gurajala et al. | |
| 2010/0122338 A1 | 5/2010 | Kataoka et al. | |
| 2010/0248640 A1 | 9/2010 | MacNaughtan et al. | |
| 2010/0322218 A1* | 12/2010 | Liu | 370/338 |
| 2011/0019639 A1* | 1/2011 | Karaoguz et al. | 370/331 |
| 2011/0116480 A1 | 5/2011 | Li et al. | |
| 2011/0205910 A1* | 8/2011 | Soomro et al. | 370/252 |
| 2011/0263242 A1* | 10/2011 | Tinnakornsrisuphap et al. | 455/422.1 |

OTHER PUBLICATIONS

S. Alexander and R. Droms, "DHCP Options and BOOTP Vendor Extensions," Network Working Group, Request for Comments: 2132, Mar. 1997.
U.S. Appl. No. 12/141,569, filed Jun. 18, 2008.
U.S. Appl. No. 12/432,736, filed Apr. 29, 2009.
U.S. Appl. No. 12/350,694, filed Jan. 8, 2009.
U.S. Appl. No. 12/397,855, filed Mar. 4, 2009.
U.S. Appl. No. 12/494,999, filed Jun. 30, 2009.
U.S. Appl. No. 12/507,913, filed Jul. 23, 2009.
U.S. Appl. No. 11/746,229, filed May 29, 2007.
U.S. Appl. No. 12/478,318, filed Jun. 4, 2009.
U.S. Appl. No. 12/538,624, filed Aug. 10, 2009.
U.S. Appl. No. 12/731,895, filed Mar. 25, 2010.
International Search Report and Written Opinion from International Application No. PCT/US2007/009296, dated Oct. 17, 2007.
R. Ferrus et al., "Evaluation of a Cell Selection Framework for Radio Access Networks Considering Backhaul Resource Limitations," The 18th Annual IEEE International Symposium on Personal, Indoor and Mobile Radio Communications (PIMRC '07), Jan. 2007.
Emilio Mino et al., "IST-4-027756 WINNERII, D4.8.3, Integration of Cooperation on WINNER II System Concept," Information Society Technologies, Nov. 29, 2007.
Gregory Conklin et al., "Video Coding for Streaming Media Delivery on the Internet," IEEE Transactions on Circuits and Systems for Video Technology, vol. 11, No. 3, Mar. 2001.
Xin Liu et al., "Experiences in a 3G Network: Interplay between the Wireless Channel and Applications," MobiCom '08, Sep. 14-19, 2008.
Woon-Young Yeo et al., "Traffic Management of High-Speed CDMA Systems Base on Loan Prediction," IEICE Electronics Express, vol. 6, No. 7, pp. 389-394, published Apr. 10, 2009.
3rd Generation Partnership Project 2, "cdma2000 High Rate Packet Data Air Interface," 3GPP2 C.S0024-0, v. 4.0, (Oct. 2002).
3rd Generation Partnership Project 2, "cdma2000 High Rate Packet Data Air Interface," 3GPP2 C.S0024-A, v. 3.0, (Sep. 2006).
First Action Interview Office Action for U.S. Appl. No. 12/956,170 dated Jan. 29, 2013.

* cited by examiner

DISCOVERING A FREQUENCY OF A WIRELESS ACCESS POINT

REFERENCE TO RELATED APPLICATION

This application is related to a co-pending application entitled "Delivery of Wireless Access Point Information," filed on the same day as this application with Ser. No. 12/956,170, the entirety of which is hereby incorporated by reference.

BACKGROUND

Femtocell wireless access points ("femtocells") may provide wireless telephony and/or data services to a limited geographical region, such as a residence or a business. A femtocell may perform base transceiver station (BTS) functions, base station controller (BSC) functions, or both, to support wireless communications with one or more wireless communication devices (WCDs). To carry out these functions, a femtocell may define one or more limited-range cellular wireless coverage areas to provide wireless coverage in areas that may not be well-served by macro-cellular wireless coverage areas.

The use of femtocells can be advantageous for both wireless service providers and end users. Femtocells may benefit wireless service providers by offloading traffic from wireless service provider networks. Femtocells may also benefit end users by providing wireless network access in places where macro-cellular wireless networks have limited or no coverage.

OVERVIEW

As the deployment of femtocells increases, it can be beneficial to have femtocells operating on frequencies that are different from those used by macro-cellular networks. For instance, a wireless service provider's macro-cellular networks may operate on frequencies in the range of 800 Megahertz to 900 Megahertz. In order to limit interference between femtocells and these macro-cellular networks, the wireless service provider may deploy femtocells that operate on frequencies outside of this range. For example, the femtocells may operate on frequencies in the 1900 Megahertz to 1950 Megahertz range.

When a WCD, such as a cell phone, powers on its cellular radio, it scans one or more frequency ranges for available wireless coverage areas. This scanning may be an expensive operation in terms of both time and battery power. Thus, it is beneficial for the WCD to discover available wireless coverage areas quickly. Since macro-cellular coverage is generally more available than that of femtocells, a WCD may scan the macro-cellular frequency range first, and then fall back to scanning the femtocell frequency range only if necessary. As a result, a WCD may discover and register with a macro-cellular wireless coverage area, and then stop scanning even though a femtocell wireless coverage area may be within range. Alternatively, if the WCD continues scanning, it may eventually discover a femtocell wireless coverage area, but at the cost of additional time and battery life consumption.

Many local networks that deploy femtocells, such as residential or business networks, also deploy Wifi (e.g., 802.11) access points. Additionally, many newer WCDs contain a cellular radio and a Wifi radio, allowing these WCDs to simultaneously access cellular and Wifi coverage areas. Thus, where a femtocell is co-located with a Wifi access point, a WCD may be able to learn about the existence of the femtocell from the Wifi access point. In particular, the Wifi access point may provide the WCD with the frequency, or frequency range, on which the femtocell is operating. Then, the WCD may tune to this frequency or scan this frequency range to be able to register with the femtocell in a timely fashion and without excessive battery drain. In this way, WCD may take advantage of the presence of femtocells, and use these femtocells in preference to macro-cellular networks.

Accordingly, in an example embodiment, a Wifi access point defines a first wireless coverage area, and a femtocell defines a second wireless coverage area that operates at an operating frequency. Via the first wireless coverage area, the Wifi access point may receive a first request from a WCD served by the first wireless coverage area. For example, the WCD may be a dual-mode WCD that is able to communicate using both Wifi and a cellular network technology. The WCD may transmit the first request in order to register for service with the Wifi access point.

In response to the first request, the Wifi access point may transmit, to the WCD, a reply containing an indication of the operating frequency. In this way, the Wifi access point informs the WCD of the femtocell's presence. Then, via the second wireless coverage area, the femtocell may receive a second request from the WCD. The WCD may transmit the second request in order to register for service with the femtocell. In response to the second request, the femtocell may register the WCD to also be served by the second wireless coverage area. As a result, the WCD may be registered for service with both the Wifi access point and the femtocell, and may use both of these services simultaneously.

In another example embodiment, a registration server may be communicatively coupled to a first wireless access point and a second wireless access point. The first wireless access point may define a first wireless coverage area, and the second wireless access point may define the second wireless coverage area.

The registration server may receive a first request from the second wireless access point. The first request may contain an indication of an operating frequency at which the second wireless access point operates. In response to the first request, the registration server may store a mapping between the second wireless access point and the operating frequency. The registration server may then receive a second request from a WCD. The second request may arrive at the registration server via the first wireless access point.

In response to the second request, the registration server may transmit, to the WCD, a reply containing the indication of the operating frequency. In this way, the registration server can notify the WCD of the second wireless access point's operating frequency, so that the WCD can use this frequency to register with the second wireless access point.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DESCRIPTION

I. System Architecture

Figure 1:
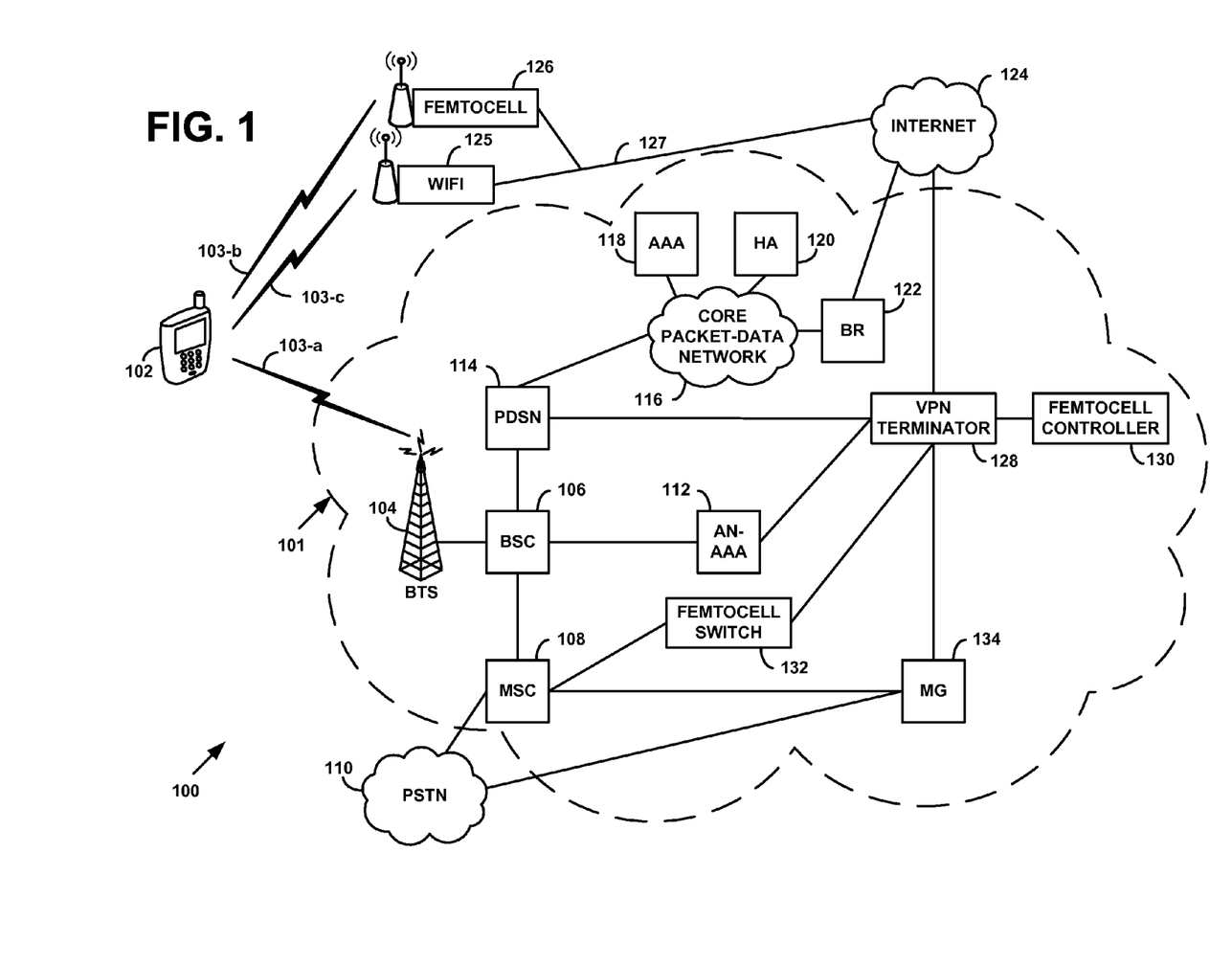
FIG. 1 depicts a network architecture, in accordance with an example embodiment.

FIG. 1 shows a block diagram of a communication network 100 that may be operated by a wireless service provider, and in which example embodiments can be deployed. Communication network 100 may operate according to various technologies including, but not limited to, Code-Division Multiple Access (CDMA), Worldwide Interoperability for Microwave Access (WIMAX®), Universal Mobile Telecommunications System (UMTS®), Long Term Evolution (LTE®), IDEN®, or Wifi. Thus, users may engage in communication via WCDs that support one or more of these or other technologies.

a. Wireless Air Interfaces

As shown, a WCD 102 may communicate with a macro-cellular radio access network (RAN) 101 over an air interface 103-a. In particular, air interface 103-a may be provided by BTS 104, which may be coupled or integrated with a BSC 106. WCD 102 is also shown as having an air interface 103-b with a femtocell 126 and an air interface 103-c with a Wifi access point 125. WCD 102 may use air interface 103-b for circuit voice and/or packet data services, while, and may use air interface 103-c for packet data services.

Transmissions over air interface 103-a from BTS 104 to WCD 102 may utilize a "forward link," while transmissions over interface 103-a from WCD 102 to BTS 104 may utilize a "reverse link." Similarly, transmissions over air interface 103-b from femtocell 126 to WCD 102 and transmissions over air interface 103-c from Wifi access point 125 to WCD 102 may utilize forward links, while transmissions over air interface 103-b from WCD 102 to femtocell 126 and transmissions over air interface 103-c from WCD 102 to Wifi access point 125 may utilize reverse links. Each forward link and each reverse link may comprise one or more traffic channels. Furthermore, the links of air interfaces 103-a, 103-b, and 103-c could be active concurrently or at different times, depending on the operational state of WCD 102, the physical location of WCD 102 with respect to BTS 104, Wifi access point 125, and femtocell 126, and the type of communication session that WCD 102 seeks or is engaged in.

Wifi access point 125 and femtocell 126 could be customer premises devices, deployed, for example, at a residence or business. Thus, both Wifi access point 125 and femtocell 126 may use broadband connection 127 (e.g., a cable modem, digital subscriber line (DSL), or T-carrier connection) to access Internet 124. While traffic passing through Wifi access point 125 may be routed by Internet 124 more or less directly to a correspondent node, at least some traffic passing through femtocell 126 may be routed to macro-cellular RAN 101 for further processing before being forwarded to correspondent nodes. This routing and further processing is discussed below in more detail.

B. Macro-Cellular RAN Architecture

With respect to macro-cellular RAN 101, BSC 106 may serve to control assignment of traffic channels (e.g., over air interface 103-a). BSC 106 may also be connected to a mobile switching center (MSC) 108, which in turn may provide access to wireless circuit-switched services such as circuit-voice and circuit-data. It should be understood that the term radio network controller (RNC) can also be used to refer to a BSC, or a combination BTS/BSC.

As represented by its connection to public-switched telephone network (PSTN) 110, MSC 108 may also be coupled with one or more other MSCs, other telephony circuit switches in the wireless service operator's (or in a different operator's) network, or other wireless communication systems. In this way, wireless communication network 100 may support user mobility across MSC regions, roaming between wireless service operators, and local and long-distance landline telephony services. Alternatively, part or all of MSC 108 may be replaced by softswitch components (not shown) that transport voice and other media over packet-switched networks, such as Internet Protocol (IP) networks.

BSC 106 may also be connected to an access network authentication, authorization, and accounting (AN-AAA) server 112. AN-AAA server 112 may support link-level authentication and authorization for WCD data sessions. Data transport may be provided by way of a communicative link between BSC 106 and a packet-data serving node (PDSN) 114, which in turn may provide connectivity with the wireless service provider's core packet-data network 116. Nodes that may reside within or adjunct to core packet-data network 116 are, by way of example, an authentication, authorization, and accounting (AAA) server 118, a mobile-IP home agent (HA) 120, and a border router (BR) 122.

PDSN 114 may be a router-like device that manages the connectivity of WCDs to a packet-switched network, such as the core packet-data network 116, the Internet 124, or one or more private IP networks (not shown). In an example embodiment, PDSN 114 may serve tens, hundreds or thousands of WCDs via point to point protocol (PPP) links to each of these WCDs. However, a PPP link to a WCD is not required for PDSN 114 to serve a WCD. PDSN 114 may also be capable of serving as a mobile-IP foreign agent.

HA 120 may serve as an anchor point for WCDs that use mobile-IP. While a WCD, such as WCD 102, may change its point of attachment from one foreign agent to another (e.g., from one PDSN to another) as it roams between wireless coverage areas, the WCD may maintain a registration with the same HA. Furthermore, in order to maintain a substantially static home IP address, the WCD may receive a home IP address assignment from an HA, and the HA may attempt to maintain this IP address assignment as the WCD moves between foreign agents.

AAA server 118 may provide network- and service-layer authentication and authorization support, and could be combined with AN-AAA server 112. Accordingly, AAA server 118 may support one or more protocols such as RADIUS and/or DIAMETER. AAA server 118 may maintain a profile for each WCD registered with the wireless service provider. Further, AAA server 118 may maintain profiles for other WCDs as well. Such a profile may contain an indication of the identity of each WCD and the WCD's subscriber (e.g., the WCD's user). For example, a profile for a given WCD may include the given WCD's network access identifier (NAI), mobile directory number (MDN), international mobile subscriber identifier (IMSI), electronic serial number (ESN), and/or mobile equipment identifier (MEID). Such a profile may also include a username, a password, and/or any other information associated with the given WCD. PDSN 114, HA 120, or both may authenticate WCD sessions and/or service requests from WCDs with AAA server 118.

BR 122 may seek to provide secure connectivity to the Internet 124. To that end, BR 122 could include a firewall, packet filter, and/or other security mechanisms. Thus, BR 122 may serve to protect core packet-data network 116, as well as macro-cellular RAN 101 in general, from potential attacks (e.g., hacking attempts, denial of service attacks, viruses, or malware) emanating from the Internet 124 or other IP networks.

Core packet-data network 116 could comprise one or more additional switches, routers, and gateways (not shown) that collectively provide transport and interconnection among the various entities and networks of macro-cellular RAN 101. In this context, for instance, core packet-data network 116 could be an overlay on, or a sub-network of, one or more additional networks.

Macro-cellular RAN 101 may also include a virtual private network (VPN) terminator 128. VPN terminator 128 may be a standalone component or combined with BR 122, HA 120, or other components of macro-cellular RAN 101. VPN terminator 128 may serve as an endpoint for secure connections with authorized devices seeking access to macro-cellular RAN 101 via unsecure, external networks such as the Internet 124. For instance, femtocell 126 may connect to Internet 124 over a broadband connection 127 to VPN terminator 128. Femtocell 126 could include a VPN client component that establishes a secure tunnel with VPN terminator 128, such that packet-data communications over the secure tunnel between femtocell 126 and VPN terminator 128 can then take place securely. Secure tunnels can be implemented according such protocols as IP Security (IPsec), although other mechanisms may be employed.

Assuming a secure VPN connection is established between femtocell 126 and VPN terminator 128, femtocell 126 may then communicate securely with other entities in macro-cellular RAN 101 by way of the VPN terminator 128. In particular, femtocell 126 may receive configuration and messaging data, and other operational parameters, from a femtocell controller 130. Femtocell controller 130 may also provide similar control and services for other femtocells connected to network macro-cellular RAN 101.

A femtocell switch 132 may act as a signaling gateway between MSC 108 and VPN terminator 128, enabling WCDs communicating via a femtocell, such as WCD 102 via femtocell 126, to engage in calls via MSC 108 to other wireless devices, as well as over PSTN 110. Media translation between packet-based media and circuit-based media may be carried out by a media gateway (MG) 134. Thus, femtocell 126 may transmit packetized data to MG 134 via VPN terminator 128. MG 134 may, in turn, translate or transcode the data to circuit-based media for transmission on PSTN 110, for example. MG 134 may perform the reverse translation for transmission in the opposite direction.

c. Femtocells

A femtocell may be considered to be a form of micro-cellular RAN. While femtocells may be deployed on user premises, femtocells can, in general, be deployed anywhere to provide wireless network coverage. Thus, wireless coverage areas defined by femtocells may overlap with wireless coverage areas from one or more macro-cellular RANs. WCDs may seek to register with either a femtocell or a macro-cellular RAN based on the respective signal strengths that the WCD receives from each of these devices, and/or based on other factors. For instance, if a WCD discovers the frequency of a femtocell, the WCD may be arranged to prefer using the femtocell over a macro-cellular RAN when both are available.

Furthermore, a femtocell typically has a small form factor, at least when compared to that of a macro-cellular RNC, so that the femtocell can be easily deployed in a particular location, or moved between locations. Thus, for instance, femtocells may be sold directly to consumers, in stores or online, and may be deployed by consumers in a residential or business network. To address the consumer and business markets, femtocells may also be low-cost, at least when compared to analogous macro-cellular devices.

As discussed above, a femtocell may be directly or indirectly coupled to a residential or business broadband network service, such as a cable modem, DSL, or T-carrier connection, so that the femtocell can communicate via the Internet. This use of wireline access to the Internet serves to offload traffic from macro-cellular RANs.

With respect to the various business entities involved in communication network 100, it is generally assumed throughout this specification that femtocell 126 is provided by, or at least associated with, the same wireless service provider that operates macro-cellular RAN 101. But, this need not be the case. Various business models may be in place through which other entities provide, manage, and/or support femtocell 126. Additionally, the individual who uses WCD 102 may be an account holder for both WCD 102 and femtocell 126 (i.e., the individual is a subscriber of the wireless service provider and his or her service plan includes WCD 102 and femtocell 126). But again, this need not be the case.

It should also be understood that the depiction of just one of each network component in FIG. 1 is illustrative, and there could be more than one of any component. Communication network 100 may also contain other types of components not shown. Alternatively or additionally, any network component in FIG. 1 could be omitted, or combined with another network component, without departing from the scope of the invention. Thus, the particular arrangement shown in FIG. 1 should not be viewed as limiting with respect to the present invention.

Further, the network components that make up a wireless communication system such as communication network 100 may be implemented as a combination of one or more integrated and/or distributed platforms, each comprising one or more computer processors, one or more forms of computer-readable storage (e.g., disks drives, random access memory, etc.), one or more communication interfaces for interconnection between components and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein.

Figure 2:
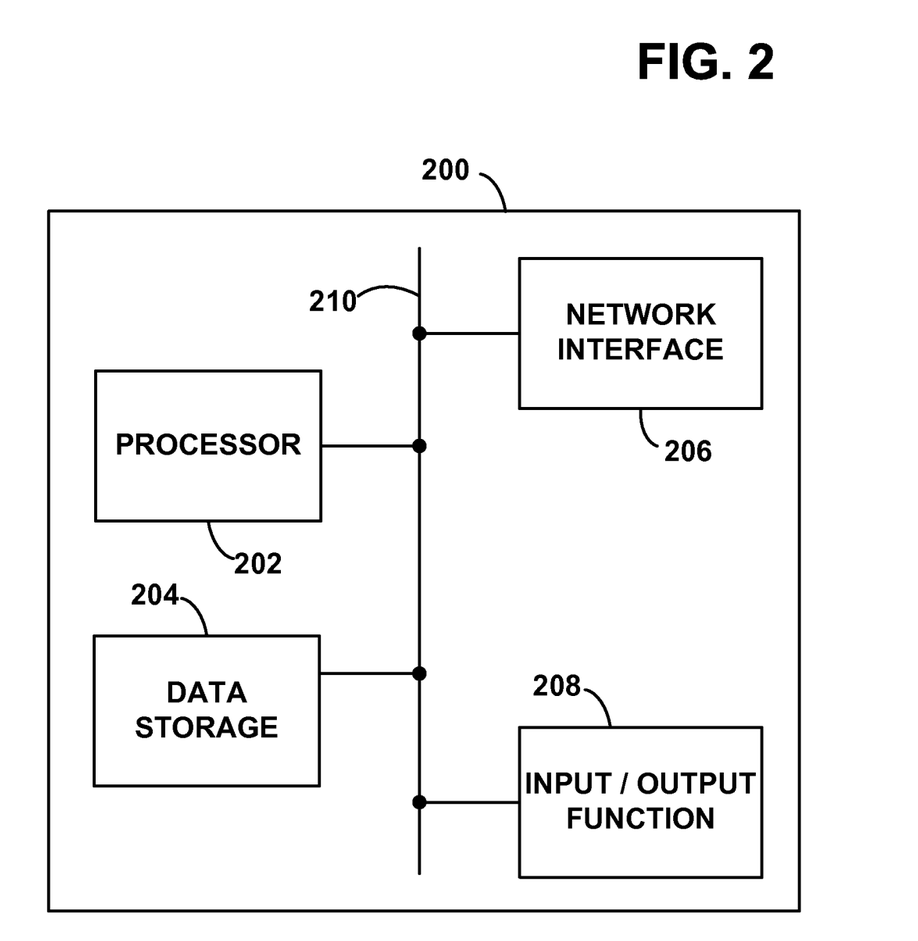
FIG. 2 is a block diagram of a wireless access point, in accordance with an example embodiment.

To that end, FIG. 2 is a simplified block diagram exemplifying a wireless access point 200 (e.g., Wifi access point 125 and/or femtocell 126) and illustrating some of the functional components that may be found in a wireless access point arranged to operate in accordance with the embodiments herein. FIG. 2 may also represent the components of other devices (e.g., clients, servers, routers, switches, and so on) discussed herein.

Wireless access point 200 preferably includes a processor 202, a data storage 204, a network interface 206, and an input/output function 208, all of which may be coupled by a system bus 210 or a similar mechanism. Processor 202 preferably includes one or more CPUs, such as one or more general purpose processors and/or one or more dedicated processors (e.g., application specific integrated circuits (ASICs) or digital signal processors (DSPs), etc.) Data storage 204, in turn, may comprise volatile and/or non-volatile data storage and can be integrated in whole or in part with processor 202.

Data storage 204 preferably holds program instructions executable by processor 202, and data that is manipulated by these instructions, to carry out the various methods, processes, or functions described herein. Alternatively, these methods, processes, or functions can be defined by hardware, firmware, and/or any combination of hardware, firmware and software. By way of example, the data in data storage 204 may contain program instructions executable by processor 202 to carry out any of the methods, processes, or functions disclosed in this specification or the accompanying drawings.

Network interface 206 may take the form of one or more wireless and/or wireline interfaces. For example, network interface 206 may comprise transceiver(s) that radiate to define one or more wireless coverage areas. These wireless coverage area may include air interfaces, such as air interfaces 103-*b* and/or 103-*c*, for engaging in communication with WCDs. Network interface 206 may also comprise a wireline interface, for example to a broadband connection, to communicate with the Internet or other IP networks. Network interface 206 may additionally comprise a wireless interface to communicate with other devices. Accordingly, network interface 206 may take the form of one or more wireless or wireline interfaces. However, other forms of physical layer connections and other types of standard or proprietary communication protocols may be used with network interface 206.

Input/output function 208 facilitates user interaction with wireless access point 200. Input/output function 208 may comprise multiple types of input devices, such as a keyboard, a mouse, a touch screen, and so on. Similarly, input/output function 208 may comprise multiple types of output devices, such as a monitor, printer, or one or more light emitting diodes (LEDs). Additionally or alternatively, wireless access point 200 may support remote access from another device, via network interface 206 or via another interface (not shown), such an RS-232 or universal serial bus (USB) port.

II. Customer Premises RAN

Figure 3:
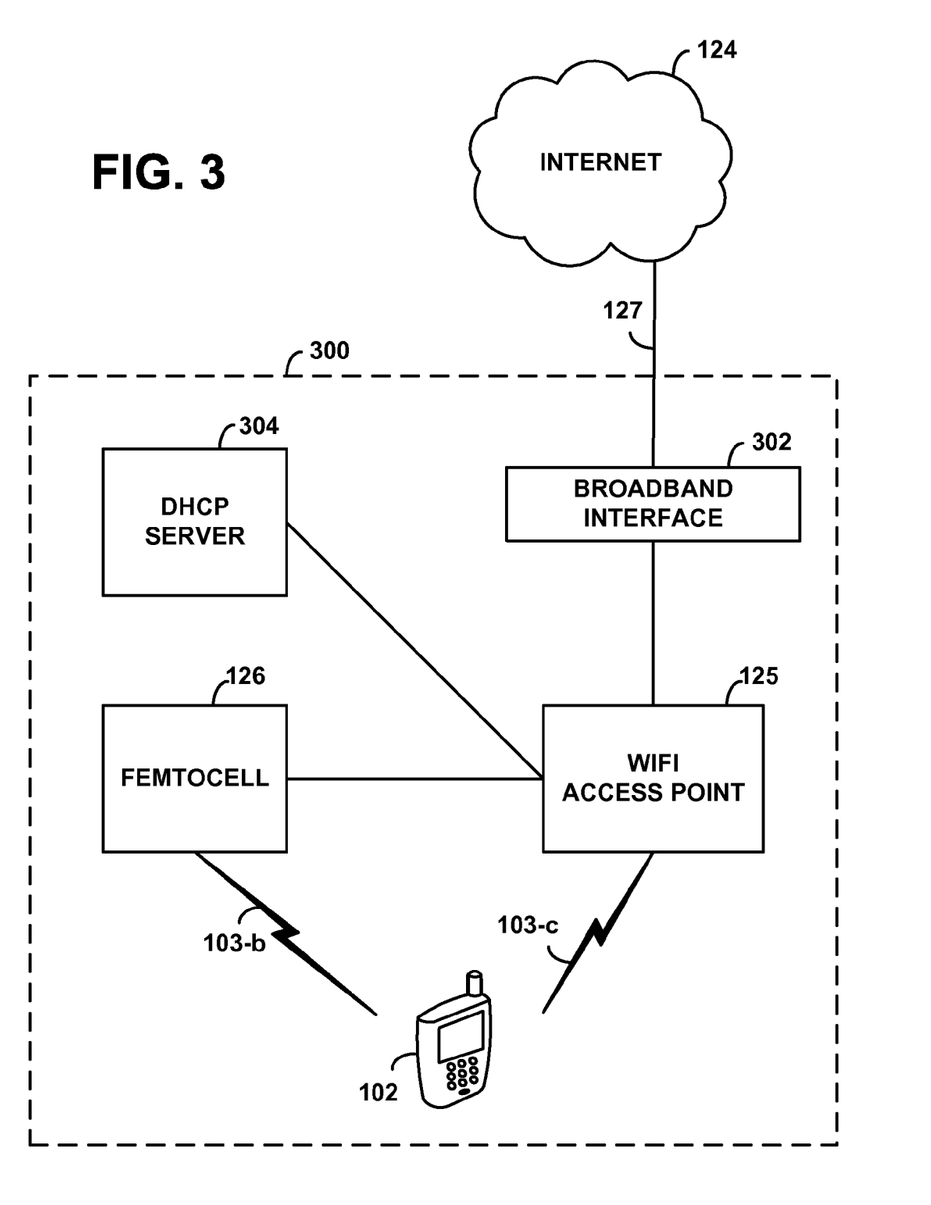
FIG. 3 depicts a RAN including a co-located femtocell and Wifi access point, in accordance with an example embodiment.

Both Wifi access points and femtocells may be communicatively coupled in a network that will be referred to as a "customer premises RAN." FIG. 3 depicts an example of a customer premises RAN 300, that includes Wifi access point 125, femtocell 126, as well as other devices and connections.

In FIG. 3, Wifi access point 125 may define a Wifi wireless coverage area that enables air interface 103-*c*, while femtocell 126 may define a cellular wireless coverage area that enables air interface 103-*b*. As discussed above, WCD 102 may use air interface 103-*b* to communicate with femtocell 126 and air interface 103-*c* to communicate with Wifi access point 125. In some embodiments, communications over air interface 103-*c* may conform, to at least some extent, with 802.11 technology. Similarly, communications over air interface 103-*b* may conform, to at least some extent, with one or more of CDMA, WIMAX®, UMTS®, LTE®, or IDEN® technologies. Thus, either air interface may be based on technologies that are now known or developed in the future. Wifi access point 125 and femtocell 126 may use different operating frequencies to define their respective wireless coverage areas.

Customer premises RAN 300 may also include Dynamic Host Configuration Protocol (DHCP) server 304 and broadband interface 302. DHCP server 304 may communicate with Wifi access point 125 and femtocell 126 via a local area network, or may be combined with either of these devices. In an example embodiment, DHCP server 304 is a configuration server that is used to assign addresses to WCDs using RAN 300, and/or pass configuration information between the various devices in RAN 300 (including WCD 102). Broadband interface 302 may be a broadband modem, such as a cable modem, DSL modem, or T-carrier line card, which allows Wifi access point 125, femtocell 126, and DHCP server 304 to communicate with the Internet 124 and other networks via broadband connection 127.

It should be understood that while DHCP is typically used to assign addresses to client devices, DHCP may also assign addresses to other types of devices. Further, DHCP is a flexible, extensible protocol that can be used to transport additional configuration information, or other types of information, between network devices. Thus, devices such as femtocell 126 may use DHCP to obtain and maintain an IP address. Further, any device in customer premises RAN 300 may partake in various types of transactions with DHCP server 304 to communicate additional information to or from DHCP server 304.

Figure 4:
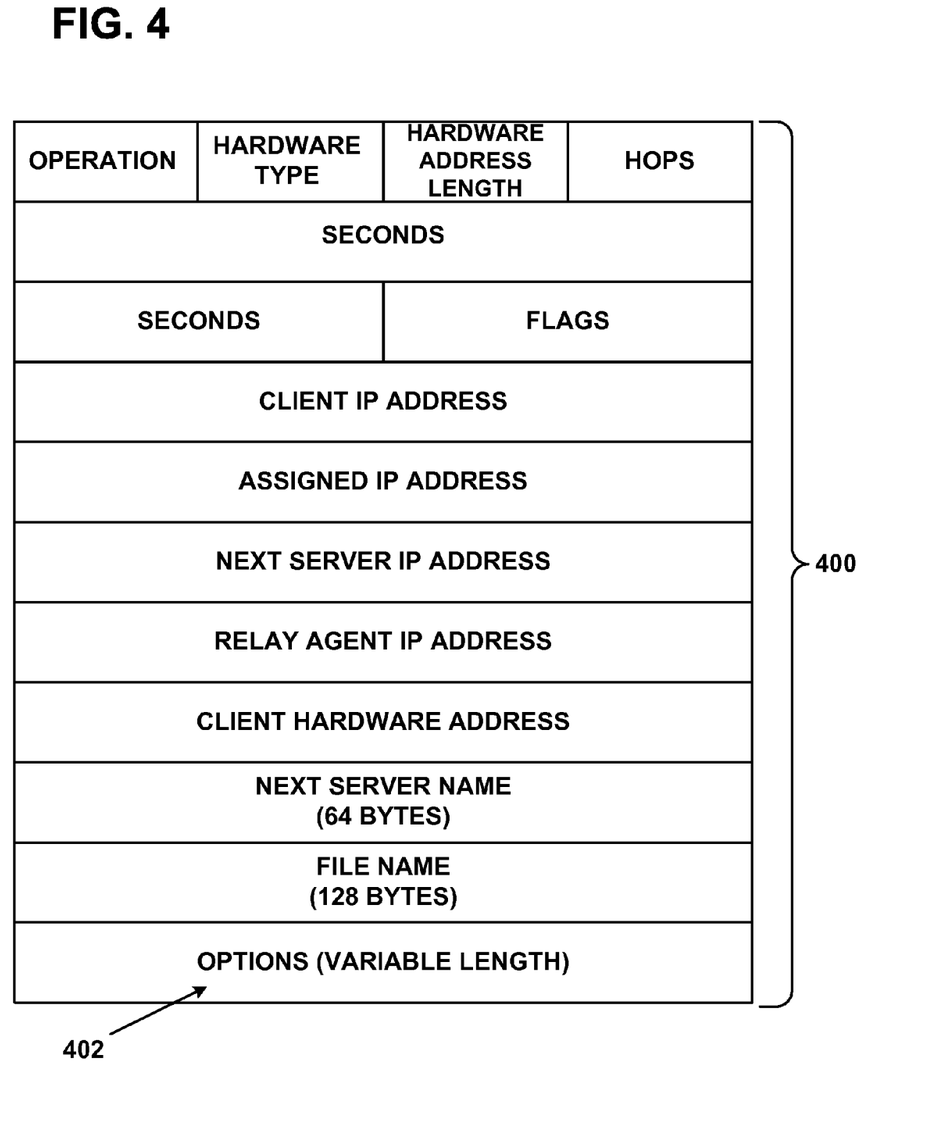
FIG. 4 is an example packet format, in accordance with an example embodiment.

FIG. 4 depicts an example DHCP header 400. Typically, such a DHCP header is placed within a User Datagram Protocol (UDP) header, which in turn is placed within an IP packet. The various fields of DHCP header 400 are described in detail in Internet Request for Comments (RFC) 2131, entitled "Dynamic Host Configuration Protocol." Accordingly, RFC 2131 is incorporated herein in its entirety.

An example DHCP transaction between a device seeking an address assignment, which shall be referred to as a "DHCP client," and a DHCP server may proceed as follows. The DHCP client may transmit a DHCPDISCOVER message to the DHCP server. This transmission may occur in response to the DHCP client booting, initializing a network interface, or for some other reason. The DHCP server may respond by transmitting a DHCPOFFER message containing a provisionally-assigned address to the DHCP client. Then, if the DHCP client determines to accept this offer, the DHCP client may transmit a DHCPREQUEST message to the DHCP server, indicating that the offer was accepted. The DHCP server may respond to the DHCPREQUEST message by transmitting a DHCPACK message to the DHCP client, thereby confirming the address assignment. Once this process concludes, the DHCP client may use the assigned address to communicate with other networked devices.

As stated above, in some DHCP transactions, additional information is passed between the DHCP client and the DHCP server. For instance, in the DHCPOFFER and/or DHCPACK messages, the DHCP server may also assign an IP network mask (netmask) to the DHCP client, and also inform the DHCP client of the address of a local router, as well as the address of one or more Domain Name System (DNS) servers. Further, the DHCP server may provide a lease time for the address assignment, after which the address assignment expires.

Once an assignment is made via DHCP, the DHCP client may request renewal of the lease time by transmitting a DHCPREQUEST message to the DHCP server. If the DHCP server grants the renewal, the DHCP server may do so by transmitting a DHCPACK message to the DHCP client. Also, the DHCP client device may request additional configuration information by transmitting a DHCPINFORM message to the DHCP server, and the DHCP server may provide the requested information to the DHCP client in a DHCPACK message.

In order to provide a mechanism for passing various types of information between the DHCP client and the DHCP server, DHCP allows for DHCP messages to include one or more options. These options may be placed in options field 402, and may encode the information using a type-length-value (TLV) format. Some options commonly used with DHCP are described in detail in Internet Request for Comments (RFC) 2132, entitled "DHCP Options and BOOTP Vendor Extensions." Accordingly, RFC 2132 is incorporated herein in its entirety.

DHCP options may include standard options, such as those listed in RFC 2132 and other documents, as well as vendor-specific options. As defined in RFC 2132, vendor-specific options are defined by particular companies, entities, or organizations in order to add functionality to DHCP without having this functionality approved by a standards organization. Usually, DHCP client and servers will only process DHCP options that they explicitly support. If a DHCP client or server receives a DHCP message containing an unsupported option, the DHCP client or server may silently ignore the option, but continue processing the rest of the DHCP packet. For purposes of simplicity, hereinafter the term "DHCP option" may refer to either a standard DHCP option or a vendor-specific DHCP option.

III. Providing a Femtocell Operating Frequency to a WCD

As discussed above, femtocell 126 may operate at a frequency that is different from frequencies used by macro-cellular networks. Thus, when within range of femtocell 126, WCD 102 may need to determine the operating frequency of femtocell 126 before WCD 102 can register for service with femtocell 126.

WCD 102 may be configured by its home wireless service provider with a preferred roaming list (PRL) of frequencies to scan when WCD 102 is seeking cellular service. The frequencies in the PRL may be arranged in a listed order, and WCD 102 may be arranged to scan the frequencies in the order listed in the PRL, starting with the first-listed frequency. If WCD 102 cannot receive a signal on the first-listed frequency at sufficient signal strength, WCD 102 may then scan the next frequency in the PRL. This process may continue until WCD 102 discovers that it can receive a frequency with a sufficiently strong signal, or WCD 102 reaches the end of the PRL.

Since the frequency scanning process takes some amount of time (and potentially some amount of the scanning WCD's battery life) per frequency scanned, the PRL may be arranged with the home wireless service provider's most commonly-used frequencies listed first. Frequencies listed further down the PRL may be less-commonly used, or may be frequencies used by roaming partners of the home service provider. Since femtocell deployments still do not have the overall coverage footprint of macro-cellular networks, femtocell frequencies may be listed after macro-cellular frequencies.

As a result, when WCD 102 is within the wireless coverage area of femtocell 126, WCD 102 may nonetheless register with a macro-cellular wireless coverage area. This may be undesirable, because WCD 102 would be using the relatively scarce resources of the macro-cellular network instead of the resources of femtocell 126. Thus, it would be advantageous for WCD 102 to learn of the operating frequency at which a femtocell operates when WCD 102 comes into range of the femtocell.

Figure 5:
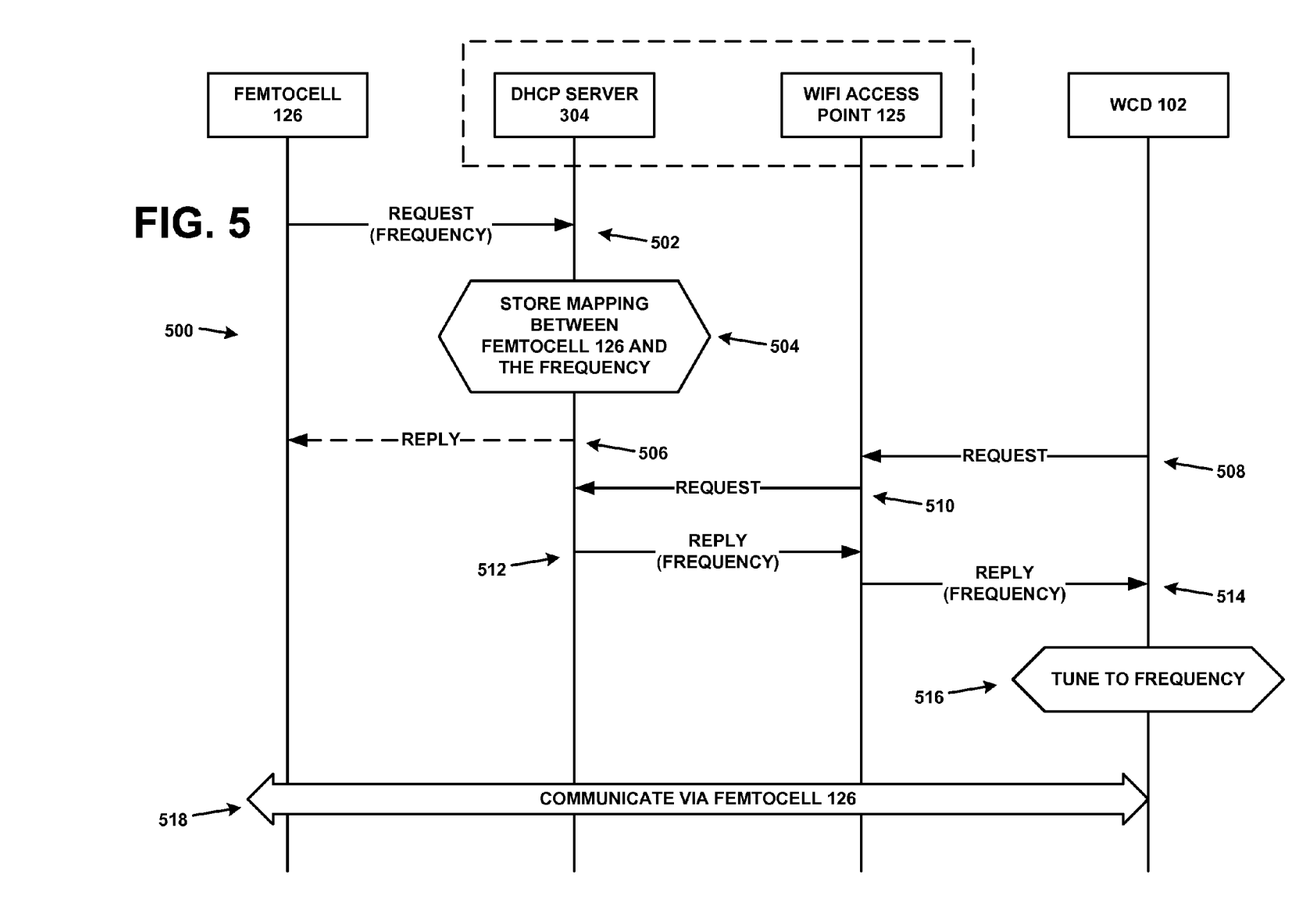
FIG. 5 is a first message flow, in accordance with an example embodiment.

FIG. 5 is a message flow 500 illustrating a possible embodiment through which WCD 102 can discover this operating frequency. Message flow 500 involves communications between WCD 102, Wifi access point 125, femtocell 126, and DHCP server 304. As denoted by the dashed line surrounding Wifi access point 125 and DHCP server 304, in a possible embodiment, these elements may be combined into the same physical device. Alternatively, these elements could reside on separate devices, or DHCP server 304 could be combined with femtocell 126.

Nonetheless, at step 502, femtocell 126 may transmit a request message to DHCP server 304. This request message may provide the operating frequency to DHCP server 504. This request message may be, for example, a DHCPDISCOVER, DHCPREQUEST, or DHCPINFORM message that femtocell 126 transmits to acquire an IP address and/or additional information from DHCP server 304. The operating frequency may be encoded in a DHCP option.

At step 504, in response to receiving the request message, DHCP server 304 may store a mapping between femtocell 126 and the operating frequency. For example, DHCP server 304 may store an association between an IP or link-layer address of femtocell 126 and the operating frequency. Then, at step 506, DHCP server 304 may transmit a reply to femtocell 126. This reply may, for example, take the form of a DHCPOFFER or DHCPACK message. However, as denoted by the dashed line, this reply message is optional, and may be omitted without departing from the scope of the invention. Further, the DHCP protocol is not the only mechanism through which DHCP server 304 can receive the operating frequency. For example, the operating frequency could be delivered to DHCP server 304 by another protocol, or the mapping between femtocell 126 and the operating frequency may be manually configured in DHCP server 304.

At steps 508 and 510, WCD 102 may transmit a request message to DHCP server 304 via Wifi access point 125. This request may also be a DHCPDISCOVER, DHCPREQUEST, or DHCPINFORM message. WCD 102 may transmit this request message to acquire an IP address and/or other information from DHCP server 304. For example, WCD 102 may transmit this request message in response to registering with Wifi access point 125 for wireless service. The request message may contain a DHCP option indicating that WCD 102 seeks information regarding a femtocell frequency.

At steps 512 and 514, in response to receiving the request message from WCD 102, DHCP server 304 may transmit a reply message to WCD 102. This reply message may reach WCD 102 via Wifi access point 125, and may provide the operating frequency to WCD 102. The operating frequency may be encoded in a DHCP option.

At step 516, after receiving the operating frequency, WCD 102 may tune to this frequency. To do so, WCD 102 preferably uses a different radio transmitter than it uses to communicate via Wifi access point 125. Then, at step 518, WCD 102 may register for service with femtocell 126 and begin to communicate with correspondent nodes via femtocell 126. Once registered with both Wifi access point 125 and femtocell 126, WCD 102 may communicate simultaneously via both Wifi access point 125 and femtocell 126. For instance, WCD 102 may use Wifi access point 125 for data communication and femtocell 126 for voice communication.

Message flow 500 allows a dual-mode WCD to advantageously discover a femtocell that is located at or near customer premises RAN 300. Since the WCD supports Wifi communication, the WCD can be configured to automatically register with any known Wifi access point when the WCD comes within range of the Wifi access point. Then, the WCD may automatically proceed to conduct DHCP transactions in order to acquire an IP address. By receiving the operating frequency of a nearby femtocell as part of these DHCP transactions with the Wifi access point, the WCD is also able to automatically register with the femtocell. As a result, the WCD may be able to avoid wasting battery life and time scanning for the femtocell's operating frequency.

Additionally, message flow 500 is backward compatible with WCDs that are not configured to understand the DHCP option in which the operating frequency appears. The preferred behavior of a DHCP client that receives a DHCP option that it doesn't support is to ignore this DHCP option. Thus, these WCDs may ignore the DHCP option, without being negatively impacted by the mechanisms described herein.

Figure 6:
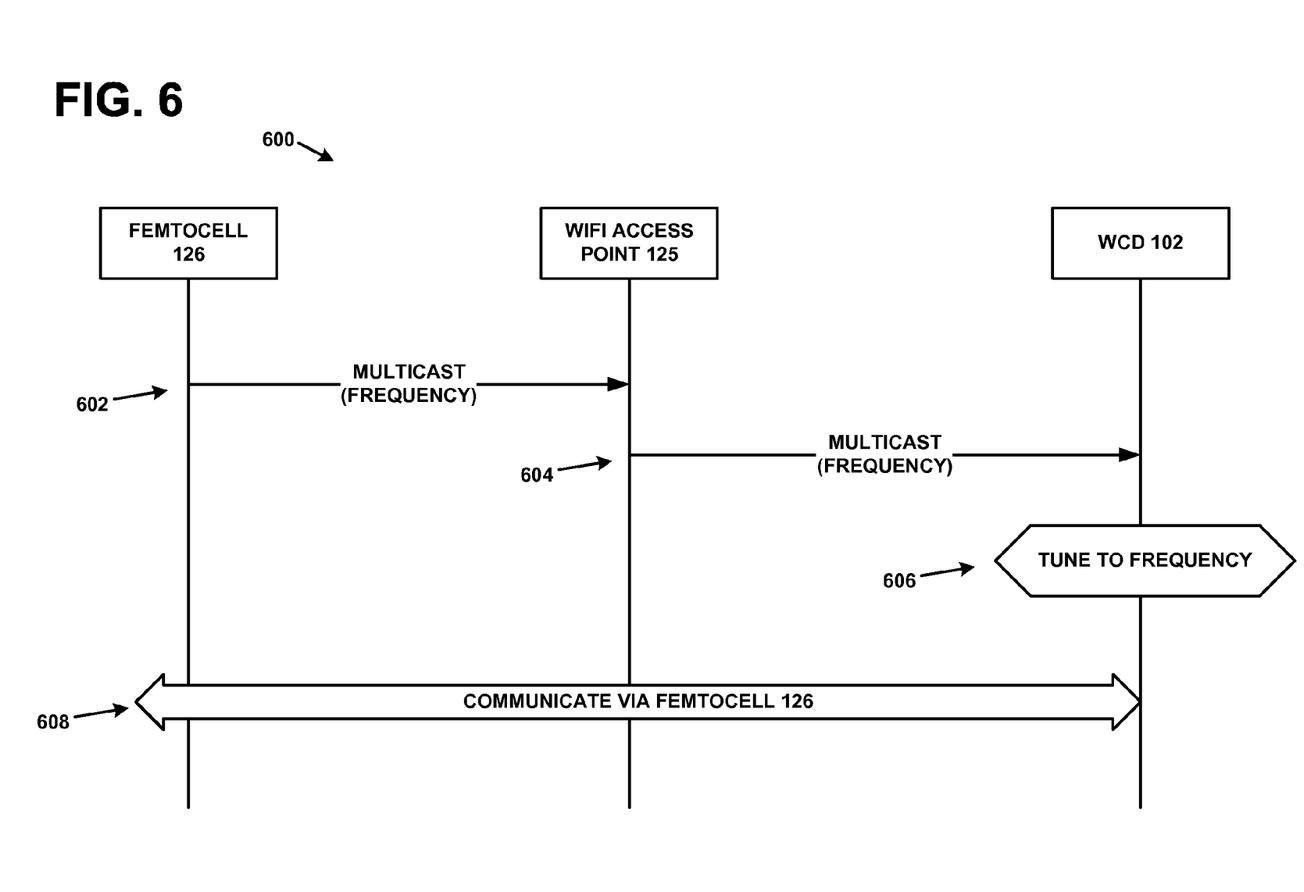
FIG. 6 is a second message flow, in accordance with an example embodiment.

However, there may be alternate ways of providing a femtocell's operating frequency to a WCD without using DHCP, and without providing the operating frequency automatically as the WCD registers for service with a Wifi access point. FIG. 6 is a message flow 600 that illustrates how a WCD can asynchronously receive the operating frequency through a mechanism other than DHCP.

Message flow 600 involves communications between WCD 102, Wifi access point 125, and femtocell 126. This communication may take place after WCD 102 has registered for service with Wifi access point 125. At steps 602 and 604, femtocell 126 may transmit a multicast message to WCD 102 via Wifi access point 125. This multicast message may contain the operating frequency.

Generally speaking, multicast messages are transmitted by a single source to multiple recipients. For example, IP multicast involves the source transmitting an IP packet to a destination IP address in the range of 224.0.0.0-239.255.255.255. Thus, one or more IP addresses in that range may be designated as IP addresses to which femtocell frequencies are transmitted. WCD 102 may be configured to receive packets transmitted to one or more of these designated IP addresses. Thus, WCD 102 may receive the multicast message from femtocell 126.

Alternatively, femtocell 126 may transmit the operating frequency in a type of broadcast message. For instance, femtocell 126 may use an IP limited broadcast message (i.e., an IP packet transmitted to the destination address 255.255.255.255) to deliver the operating frequency to any WCDs able to receive packets transmitted to that address.

Also, regardless of whether femtocell 126 uses multicast, broadcast, or some other mechanism to deliver the operating frequency to WCDs, femtocell 126 may transmit the operating frequency periodically, or from time to time. Thus, for example, femtocell 126 may transmit the operating frequency every 10 seconds, 2 minutes, or 3 hours.

At step 606, after receiving the operating frequency, WCD 102 may tune to this frequency. Then, at step 608, WCD 102 may register for service with femtocell 126 and begin to communicate with correspondent nodes via femtocell 126. Again, once registered with both Wifi access point 125 and femtocell 126, WCD 102 may communicate simultaneously via both Wifi access point 125 and femtocell 126.

It should be understood that message flows 500 and 600 are presented for purposes of example. Thus, these message flows may contain more or fewer steps that may be repeated and/or performed in a different order. Additionally, message flows 500 and 600 may be combined, in whole or in part, without departing from the scope of the invention.

Figure 7:
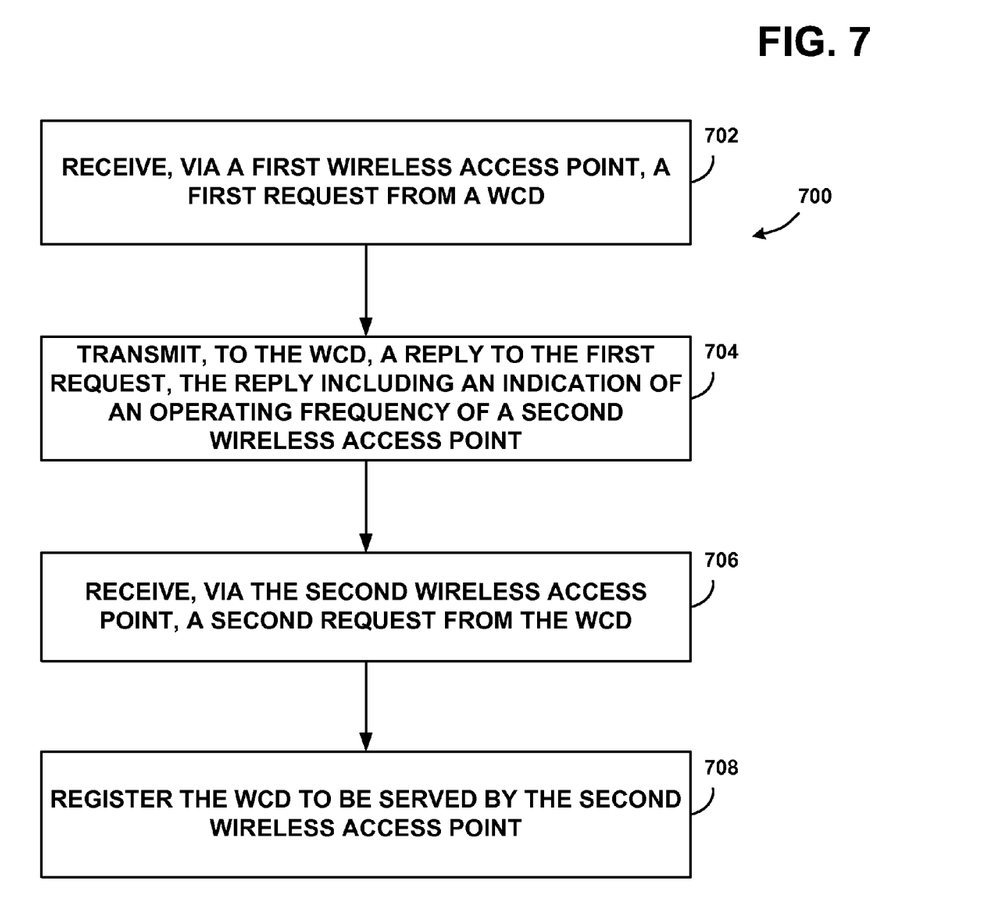
FIG. 7 is a first flow chart, in accordance with an example embodiment.
Figure 8:
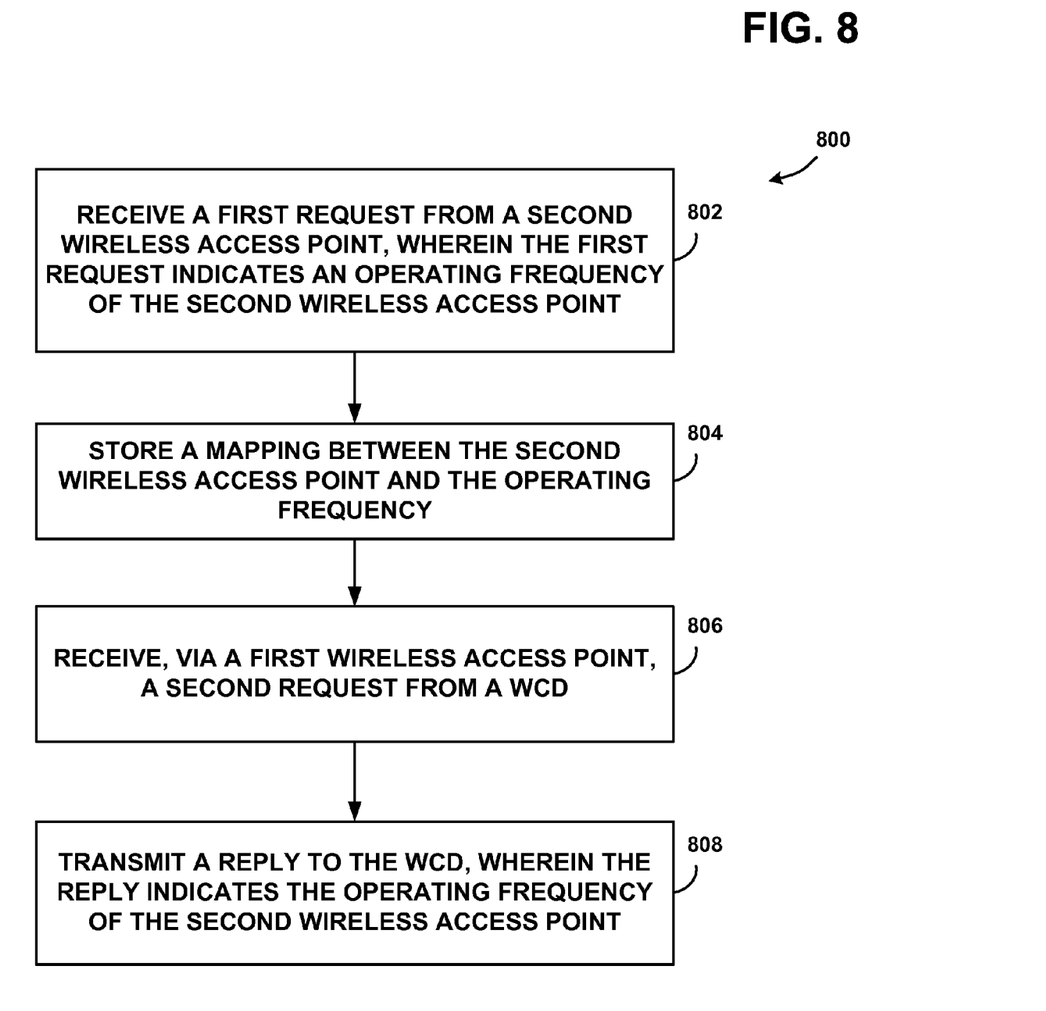
FIG. 8 is a second flow chart, in accordance with an example embodiment.

FIGS. 7 and 8 are flow charts illustrating methods 700 and 800, respectively. These methods may be used by one or more components of customer premises RAN 300 to provide a femtocell's operating frequency to a WCD. Like message flows 500 and 600, these methods are presented for purposes of example, and should be construed as non-limiting embodiments.

For flow chart 700, a first wireless access point may define a first wireless coverage area, and a second wireless access point may define a second wireless coverage area. The first and second wireless coverage areas may substantially overlap with one another, and may use different wireless access technologies. The second wireless coverage area may operate at an operating frequency.

In some possible embodiments, the first wireless access point may be a Wifi access point and the second wireless access point may be a femtocell access point. These wireless access points may be individual devices, or may be combined into a single device that performs the functions of both access points.

At step 702, via the first wireless coverage area, the first wireless access point may receive a first request from a WCD that is being served by the first wireless coverage area. The first request may seek to determine the operating frequency. At step 704, in response to the first request, the RAN may transmit, to the WCD, a reply containing an indication of the operating frequency. Either or both of the first request and the reply may take the form of DHCP messages, and the operating frequency may be encoded in a DHCP option.

Then, at step 706, the second wireless access point may receive, via the second wireless coverage area, a second request from the WCD. At step 708, in response to the second request, the second wireless access point may register the WCD to also be served by the second wireless coverage area. This registration may result in the WCD being able to exchange communications with correspondent nodes via either the first or second wireless coverage areas. Thus, after WCD is registered to be served by the second wireless coverage area, the WCD may be simultaneously served via both wireless coverage areas.

For flow chart 800, a registration server (e.g., a DHCP server) may be communicatively coupled to a first wireless access point (e.g., a Wifi access point) and a second wireless access point (e.g., a femtocell). The first wireless access point may define a first wireless coverage area, and the second wireless access point may define a second wireless coverage area. The first and second wireless coverage areas may substantially overlap with one another, and may use different wireless access technologies.

At step 802, the registration server may receive a first request from the second wireless access point. The first request may indicate an operating frequency of the second wireless access point. At step 804, in response to the first request, the registration server may store a mapping between the second wireless access point and the operating frequency.

At step 806, the registration server may receive a second request from a WCD. The second request may arrive at the registration server via the first wireless access point, and may seek to determine the operating frequency. Then, at step 808, in response to receiving the second request, the registration server may transmit, to the WCD, a reply that indicates the operating frequency of the second wireless access point.

To transmit the operating frequency, the registration server may first access the stored mapping between the second wireless access point and the operating frequency. Further, in some embodiments, the first request, the second request, and the reply may take the form of DHCP messages, and the operating frequency may be encoded in a DHCP option.

IV. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising:

receiving, by a first wireless access point, a first request from a wireless communication device (WCD), wherein the first wireless access point stores an indication of an operating frequency of a second access point, and wherein the first wireless access point is a Wifi access point and the second wireless access point is a femtocell access point;

transmitting, by the first wireless access point, a reply to the WCD, wherein the reply is in response to the first request and the reply includes the indication of the operating frequency of the second wireless access point, wherein the first request and the reply both comprise Dynamic Host Configuration Protocol (DHCP) messages, and the operating frequency is encoded in a DHCP option;

receiving, by the second wireless access point via the operating frequency, a second request from the WCD; and in response to the second request, registering the WCD to be served by the second wireless access point.

2. The method of claim 1, further comprising:

after registering the WCD to be served by the second wireless access point, the first and second wireless access points simultaneously serving the WCD.

3. The method of claim 1, wherein the first request requests the operating frequency.

4. The method of claim 1, wherein the first wireless access point defines a first wireless coverage area, and the second wireless access point defines a second wireless coverage area.

5. A method comprising:

receiving, by a first wireless access point, a first request from a wireless communication device (WCD), wherein the first wireless access point stores an indication of an operating frequency of a second access point, and wherein the first wireless access point is a Wifi access point and the second wireless access point is a femtocell access point;

in response to the first request, assigning, by the first wireless access point, an address to the WCD;

after assigning the address to the WCD, transmitting, by the first wireless access point, a message to the WCD, wherein the message contains an indication of the operating frequency of the second wireless access point, wherein the first request and the message both comprise Dynamic Host Configuration Protocol (DHCP) messages, and the operating frequency is encoded in a DHCP option;

receiving, by the second wireless access point via the operating frequency, a second request from the WCD; and in response to the second request, registering the WCD to be served by the second wireless access point.

6. A system comprising:

a first transceiver configured for wireless communication at a first operating frequency according to a Wifi protocol;

a second transceiver configured for wireless communication at a second operating frequency according to a femtocell protocol, wherein the first and second operating frequencies are different;

a processor;

a data storage that stores an indication of the second operating frequency; and program instructions, stored in the data storage and executable by the processor to (i) receive, via the first transceiver, a first request from a wireless communication device (WCD), (ii) transmit, via the first transceiver, a reply to the WCD, wherein the reply is in response to the first request, the reply including the indication of the second operating frequency, and wherein the first request and the reply both comprise Dynamic Host Configuration Protocol (DHCP) messages, and the operating frequency is encoded in a DHCP option, (iii) receive, via the second transceiver, a second request from the WCD, and, (iv) in response to the second request, register the WCD to be served by the second transceiver.

7. The system of claim 6, further comprising:

a first wireless access point including the first transceiver; and a second wireless access point including the second transceiver.

8. The system of claim 7, wherein the first wireless access point contains the program instructions to receive the first request and transmit the reply, and wherein the second wireless access point contains the program instructions to receive the second request and register the WCD.

9. The system of claim 6, wherein the first request requests the second operating frequency.

* * * * *